(12) United States Patent
Hideg et al.

(10) Patent No.: US 8,795,118 B2
(45) Date of Patent: Aug. 5, 2014

(54) ELECTRIC MOTOR ASSIST FOR TRANSMISSION ELECTRIC OIL PUMP

(75) Inventors: Laszlo Hideg, Sterling Heights, MI (US); Zhenxing Fu, San Diego, CA (US); Xiaodong Liu, Windsor (CA); Dumitru Puiu, Sterling Heights, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 77 days.

(21) Appl. No.: 13/409,388

(22) Filed: Mar. 1, 2012

(65) Prior Publication Data

US 2012/0275930 A1    Nov. 1, 2012

Related U.S. Application Data

(60) Provisional application No. 61/449,136, filed on Mar. 4, 2011.

(51) Int. Cl.
*F16H 3/72*    (2006.01)
*F16H 31/00*    (2006.01)

(52) U.S. Cl.
USPC .................................. 475/8; 475/137; 475/5

(58) Field of Classification Search
CPC .......... B60W 10/30; B60W 2510/107; B60W 2510/087; B60W 2710/1072; B60W 30/18054
USPC ...................................................... 475/8, 137
See application file for complete search history.

(56) References Cited

U.S. PATENT DOCUMENTS

| | | | |
|---|---|---|---|
| 6,964,631 B2 * | 11/2005 | Moses et al. | 477/3 |
| 2007/0149338 A1 * | 6/2007 | Ebner et al. | 475/116 |
| 2008/0011529 A1 * | 1/2008 | Hoher et al. | 180/65.2 |
| 2009/0280941 A1 | 11/2009 | Dusenberry | |

FOREIGN PATENT DOCUMENTS

| | | |
|---|---|---|
| DE | 102007043737 A1 | 3/2009 |
| WO | WO 2006/012995 A1 | 2/2006 |

* cited by examiner

*Primary Examiner* — Justin Holmes
*Assistant Examiner* — Lillian Nguyen
(74) *Attorney, Agent, or Firm* — Ralph E Smith

(57) ABSTRACT

A method for assisting a transmission oil pump in a hybrid electric powertrain to generate transmission oil pressure rapidly during vehicle start. An electric motor is initially utilized to provide momentary torque to rotate an oil pump and rapidly generate transmission oil pressure. After initial assistance is provided by the electric motor, an oil pump electric motor powers the oil pump and maintains oil pressure within the hybrid powertrain.

16 Claims, 4 Drawing Sheets

ELECTRIC MOTOR ASSIST FOR TRANSMISSION ELECTRIC OIL PUMP

CROSS-REFERENCE TO RELATED APPLICATION

This application claims the benefit of U.S. Provisional Ser. No. 61/449,136, filed Mar. 4, 2011.

FIELD

The present disclosure relates to a method for assisting a transmission oil pump in a hybrid electric transmission, and more particularly to a method for assisting the transmission oil pump to generate transmission oil pressure rapidly during vehicle start to enable electric propulsion quickly after a crank signal from an operator.

BACKGROUND

Current hybrid powertrain electric motors provide multiple functions including engine start, electric propulsion, electrical energy recovery, and synchronous shift strategy. Many hybrid powertrains allow vehicle operation while the internal combustion engine of the vehicle is completely turned off. To pressurize hydraulic oil, which allows for the operation of the clutches and other devices essential to the operation of the hybrid powertrain, an electrically powered oil pump typically must be operated while the internal combustion engine is switched off. The electrically powered oil pump is typically a small, low power pump for cost, packaging, efficiency and other reasons. Thus, when the hybrid powertrain has been sitting idle for an extended period of time, particularly in colder climates, the viscous nature of the hydraulic oil combined with the small size of the electrically powered oil pump can result in a several second delay from when the hybrid powertrain is activated to the time at which hydraulic pressure reaches sufficient pressures for transmission operation. In some circumstances, it may take over 2.25 seconds from the command to pressurize the hydraulic system until adequate pressure is achieved. In some circumstances, the electrically powered oil pump may be simply incapable of achieving adequate oil pressure without the assistance of the internal combustion engine.

SUMMARY

In one form, the present disclosure provides a method of operating a hybrid powertrain including an electric motor, an over-running clutch coupled to the electric motor, an oil pump electric motor coupled to the over-running clutch, and an oil pump coupled to the oil pump electric motor. The method includes activating the electric motor to rotate the oil pump and activating the oil pump electric motor to rotate the oil pump. The method further includes deactivating the electric motor after the oil pump is rotating.

In another form, the present disclosure provides a method of operating a hybrid powertrain including an engine, a transmission input shaft coupled to the engine, an electric motor coupled to the transmission input shaft by a planetary gear set, and an over-running clutch coupled to said transmission input shaft. The over-running clutch is coupled to the transmission input shaft such that the over-running clutch can rotate with respect to the transmission input shaft in a first direction but is prevented from rotating with respect to the transmission input shaft in a second, opposite direction. The hybrid powertrain also includes an oil pump electric motor having an oil pump electric motor rotor coupled to the over-running clutch and an oil pump having an oil pump impeller coupled to the over-running clutch. The method of operating the hybrid powertrain further includes powering the electric motor to rotate the oil pump impeller, powering the oil pump electric motor once the electric motor is already powered, and decoupling the electric motor from the oil pump electric motor rotor and the oil pump impeller using the over-running clutch after the oil pump electric motor is powered. The method of operating the hybrid powertrain causes the oil pump to achieve a desired oil pressure within a desired amount of time.

Further areas of applicability of the present disclosure will become apparent from the detailed description and claims provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

Figure 1:
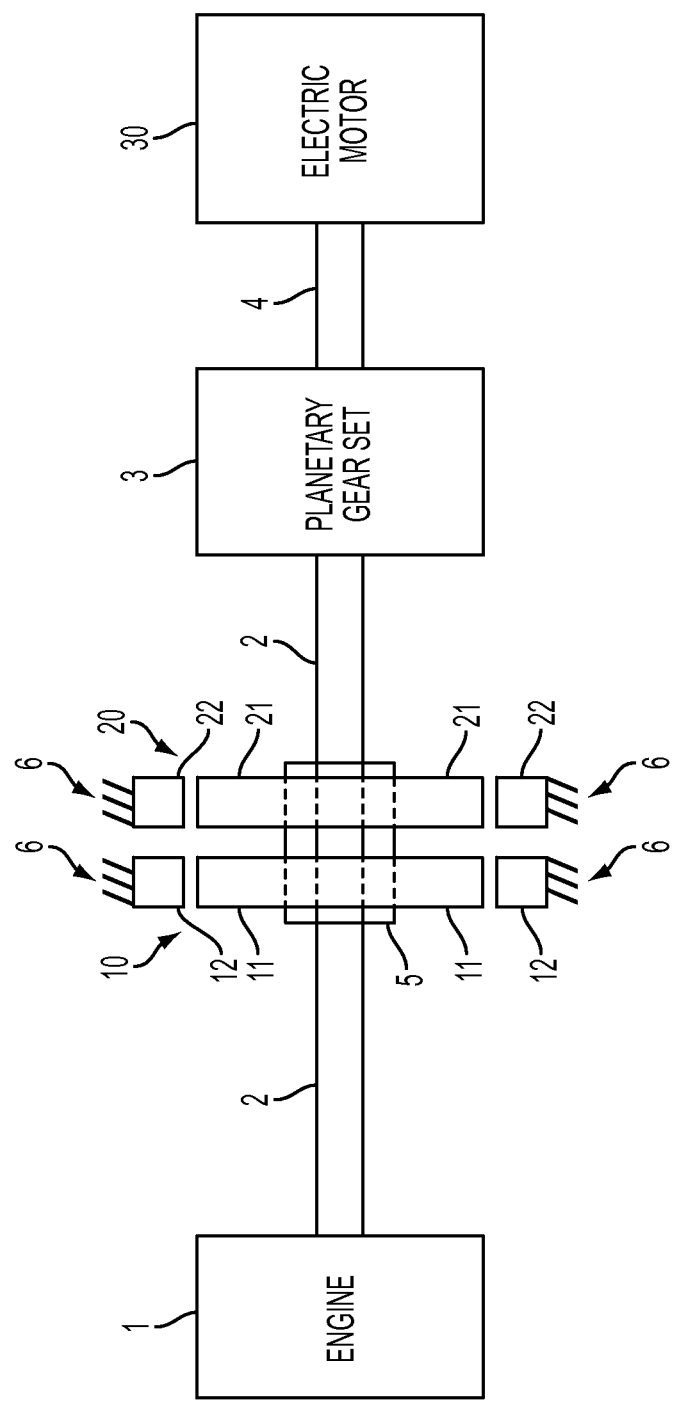
FIG. 1 is schematic representation of a side view of the hybrid powertrain according to the principles of the present disclosure.

FIG. 1 is schematic representation of a side view of a hybrid powertrain according to the principles of the present disclosure. The hybrid powertrain includes an engine 1, planetary gear set 3, and electric motor 30. The engine 1 is connected to the input of the planetary gear set 3 by a transmission input shaft 2. The transmission input shaft 2 may be the same shaft as an engine crankshaft or a different shaft. The output of the planetary gear set 3 is connected to the electric motor 30 by a transmission shaft 4. The planetary gear set 3 may be a planetary gear set or any other type of gear set as required by the operational considerations of the hybrid powertrain. The hybrid powertrain may be connected to the rest of the vehicle's drive train in any desired manner.

The transmission input shaft 2 includes an over-running clutch 5 concentrically mounted upon it. The over-running clutch 5 permits free rotational movement between the over-running clutch 5 and the transmission input shaft 2 in a first direction of rotation, but does not permit any rotation between the over-running clutch 5 and the transmission input shaft 2 in a second, opposite direction of rotation. Thus, the over-running clutch 5 may spin faster than the transmission input shaft 2 in the first direction of free rotation. The over-running clutch 5 may be a free-wheeling clutch, one-way bearing, or any other device that permits rotation between the over-running clutch 5 and the transmission input shaft 2 in the first direction, but not in the opposite direction.

The hybrid powertrain also includes an oil pump electric motor 10 and an oil pump 20. The oil pump electric motor 10 includes an oil pump electric motor rotor 11 coupled to the over-running clutch 5 and an oil pump electric motor stator 12 coupled to the transmission housing 6 of the hybrid powertrain. The oil pump 20 includes an oil pump impeller 21 coupled to the over-running clutch 5 and an oil pump housing 22 coupled to the transmission housing 6 of the hybrid powertrain. The oil pump electric motor rotor 11, oil pump impeller 21, and over-running clutch 5 are all coupled together and rotate synchronously around the transmission input shaft 2. The oil pump electric motor rotor 11, oil pump impeller 21, and over-running clutch 5 all rotate when the oil pump electric motor 10 is powered. The oil pump 20 is coupled to transmission hydraulics (not shown) as would be readily understood in the art.

During vehicle operation with the engine 1 operating, the engine causes the transmission input shaft 2 to rotate. The over-running clutch 5 is engaged while the engine 1 is on and, therefore, rotates synchronously with the transmission input shaft 2. During operation with the engine 1 on, the oil pump electric motor 10 is switched off. Rotation of the over-running clutch 5 also rotates the oil pump electric motor rotor 11 and oil pump impeller 21, thereby creating oil pressure to power clutches within the hybrid powertrain and permit the powertrain's operation.

When the engine 1 is turned off from operation (i.e., "Engine Stop Maneuver"), the oil pump electric motor 10 is activated, thereby causing the oil pump electric motor rotor 11 and over-running clutch 5, to which the oil pump impeller 21 is coupled, to rotate. While the engine 1 is turned off, the engine 1 and transmission input shaft 2 do not rotate. Meanwhile, the over-running clutch 5 rotates freely about the transmission input shaft 2. Rotation of the oil pump electric motor rotor 11 also rotates the oil pump impeller 21, thereby creating oil pressure and facilitating the operation of the hybrid powertrain.

In some operating situations, including cold startup and startup in subzero conditions, the oil pump electric motor 10 may be unable to provide adequate oil pressure to the hybrid powertrain within the desired amount of time. The hybrid powertrain of the present disclosure is capable of providing an assist function for the oil pump electric motor 10 during vehicle startup and as otherwise desired.

Figure 2:
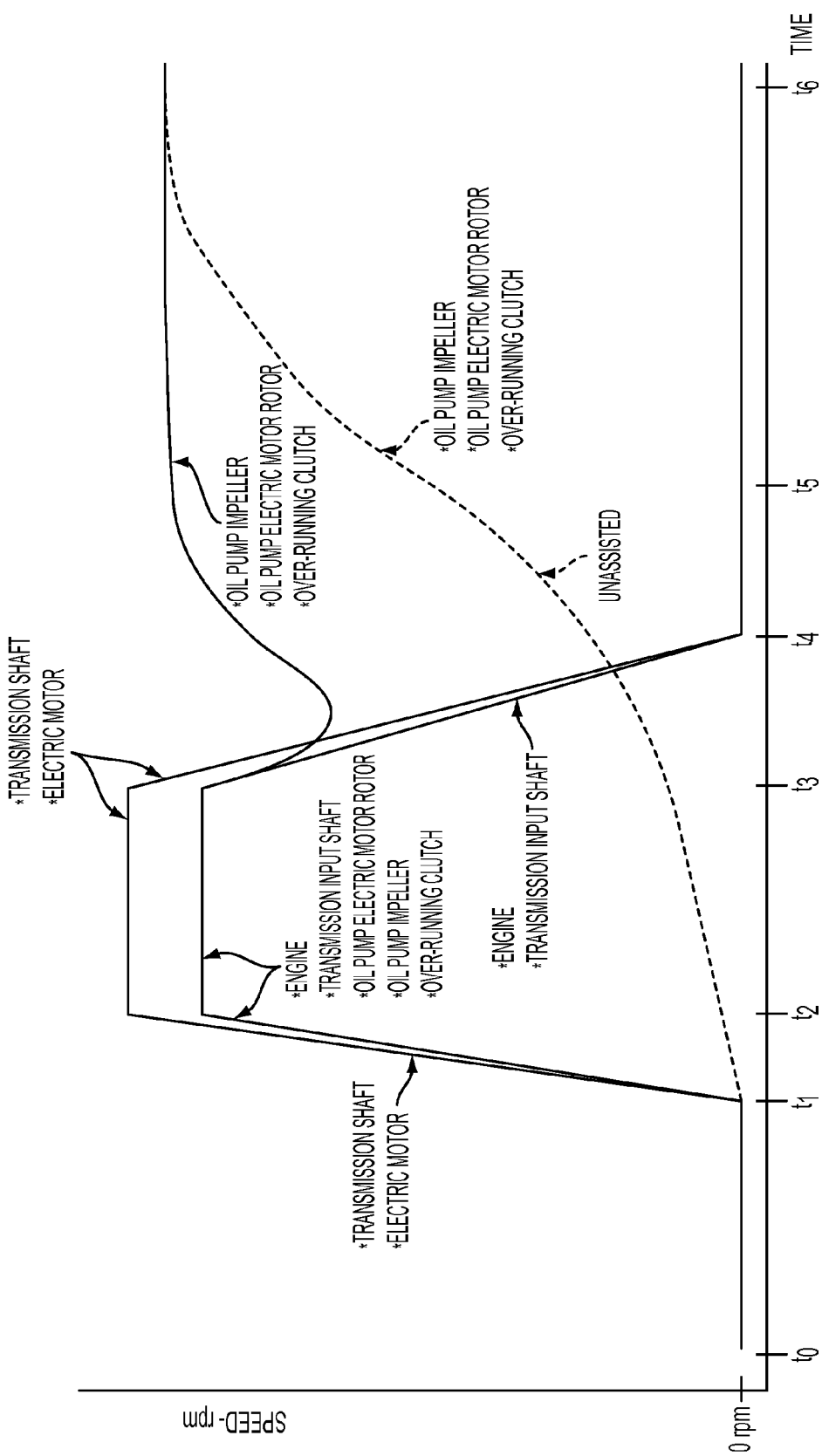
FIG. 2 is a graph of exemplary rotational speeds of the engine, transmission input shaft, oil pump electric motor rotor, oil pump impeller, and electric motor.

FIG. 2 is a graph of example rotational speeds of the engine 1, transmission input shaft 2, oil pump electric motor rotor 11, oil pump impeller 21, transmission shaft 4, and electric motor 30. With reference to FIG. 2, during a vehicle start, initially ($t_0$-$t_1$), none of the components of the hybrid powertrain are rotating. At $t_1$, the electric motor 30 is activated, thereby, causing the electric motor 30 and transmission shaft 4 to rotate at a first number of rotations per minute (RPM). The engine 1, transmission input shaft 2, over-running clutch 5, oil pump electric motor rotor 11, oil pump impeller 21, all connected to the electric motor 30 through the planetary gear set 3, rotate at a second RPM. The over-running clutch 5 is engaged by the rotation of the transmission input shaft 2. It should be noted that although the engine 1 is rotating during the startup method of FIG. 2, the engine 1 is never activated (no-spark or fuel). In some embodiments, the engine 1 may be selectively disconnected from the transmission input shaft 2 by a clutching mechanism such that it does not rotate during the startup procedure.

Between $t_1$ and $t_2$ (Ramp Up), the rotational speeds of the electric motor 30, transmission shaft 4, engine 1, transmission input shaft 2, over-running clutch 5, oil pump electric motor rotor 11, oil pump impeller 21 rapidly increase as a result of the torque being applied by the electric motor 30.

At $t_2$, the oil pump electric motor 10 is activated. Thus, between $t_2$ and $t_3$ (Stabilize Pump Motor), both the oil pump electric motor 10 and electric motor 30 are providing the torque to power the oil pump impeller 21. During this time, the oil pump electric motor 10 is stabilized and satisfactory oil pressure is generated for the hybrid powertrain. Thus, the hybrid powertrain now has adequate oil pressure to enable the use of the hybrid powertrain clutches and, thus, enable movement of the vehicle. At $t_3$, the electric motor 30 is switched off while the oil pump electric motor 10 remains activated and takes over the task of powering the rotation of the oil pump impeller 21 and, thus, of providing oil pressure for the hybrid powertrain. Between $t_3$ and $t_4$ (Ramp Down), the electric motor 30, transmission shaft 4, engine 1, and transmission input shaft 2, all now unpowered, rapidly slow in rotational speed until at $t_4$, they are no longer rotating. Between $t_4$ and $t_5$ (Hydraulic Hand-Off), the oil pump electric motor 10, no longer with the assistance of the electric motor 10, assumes the task of providing oil pressure for the hybrid powertrain and reaches a steady state oil pressure at $t_5$ (Stabilization). After $t_5$, the oil pump electric motor 10 has stabilized and is capable of providing adequate and consistent oil pressure for the hybrid powertrain without the assistance of the electric motor 30.

In an exemplary embodiment, the disclosed hybrid powertrain utilizing the electric motor 30 to initially assist the oil pump electric motor 10 in providing adequate oil pressure can reach sufficient oil pressure within less than two seconds. In one exemplary embodiment, adequate oil pressure can be achieved in less than 1.5 seconds. In another exemplary embodiment, adequate oil pressure can be achieved in less than 1.25 seconds. In yet another exemplary embodiment, adequate oil pressure can be achieved in less than one second. Adequate oil pressure may be between 600 and 1,000 kPa, less than 600 kPa, or greater than 600 kPa. In one embodiment, adequate oil pressure may be 600, 700, 800, 900, or 1000 kPa. When using the prior art oil pump electric motor 10 without the assistance of the electric motor 30, adequate and consistent oil pressure for the hybrid powertrain is not reached until $t_6$ (as indicated by the dashed line in FIG. 2). The prior art system may take over 2.25 seconds to achieve adequate oil pressure.

The method of operation of the hybrid powertrain as depicted in FIG. 2 allows for the rapid pressurization of the oil within the hybrid powertrain. This allows a vehicle utilizing the hybrid powertrain to be placed into motion more quickly after vehicle start up than a vehicle which relies solely upon the oil pump electric motor to supply the torque to generate oil pressure. In some embodiments, the method or operation may allow a vehicle utilizing the hybrid powertrain to be driven nearly immediately. In such an embodiment, the electric motor 30 would not be depowered after $t_3$. Rather, the electric motor 30 would be disconnected from the transmission input shaft 2 by a clutching mechanism or other device, allowing the electric motor 30 to rotate and cause the vehicle to move without rotating the transmission input shaft 2 or engine. In some embodiments, the oil pump electric motor 10 may be activated before, at the same time as, or at any time after the electric motor 30 is activated.

Figure 3:
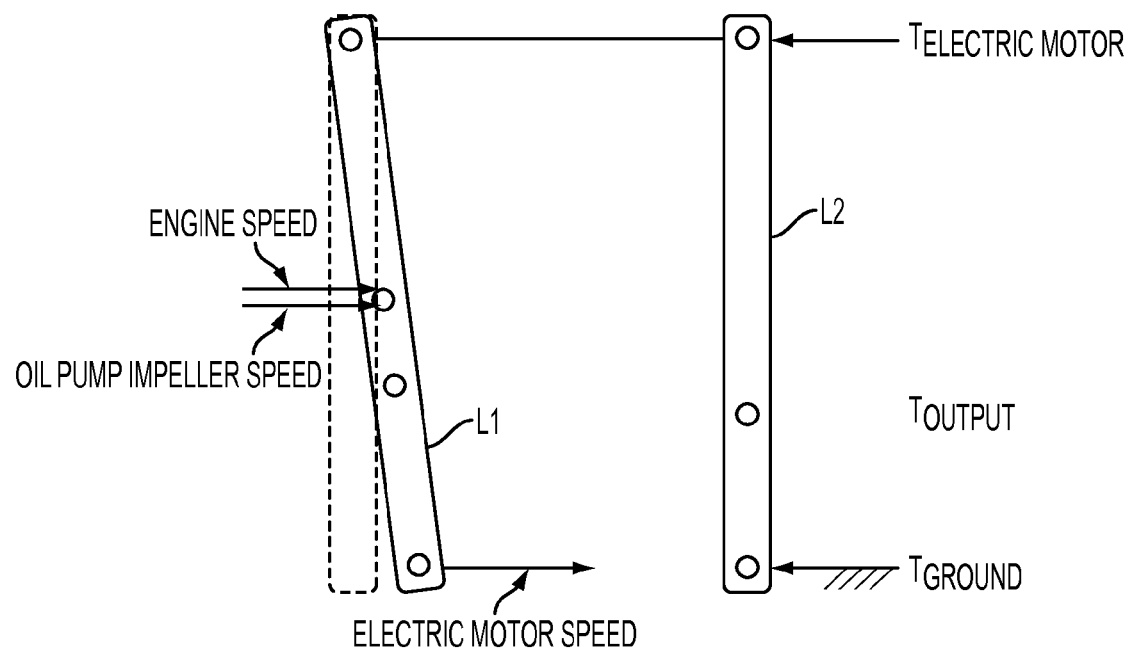
FIG. 3 is a lever diagram of the hybrid powertrain during the ramp up and stabilize pump motor periods.

FIG. 3 is a lever diagram of the hybrid powertrain during the Ramp Up and Stabilize Pump Motor periods. As depicted by lever $L_1$, during the Ramp Up and Stabilize Pump Motor periods ($t_1$-$t_3$ in FIG. 2), the rotation of the electric motor 30 causes the engine 1 and oil pump impeller 21 to rotate. As depicted by lever L2, torque applied by the electric motor 30 to the oil pump impeller 21 ($T_{Electric\ Motor}$) is balanced out by the torque applied by the transmission housing ($T_{Ground}$). During this time period, the engine 1 is not activated and does not provide any torque.

Figure 4:
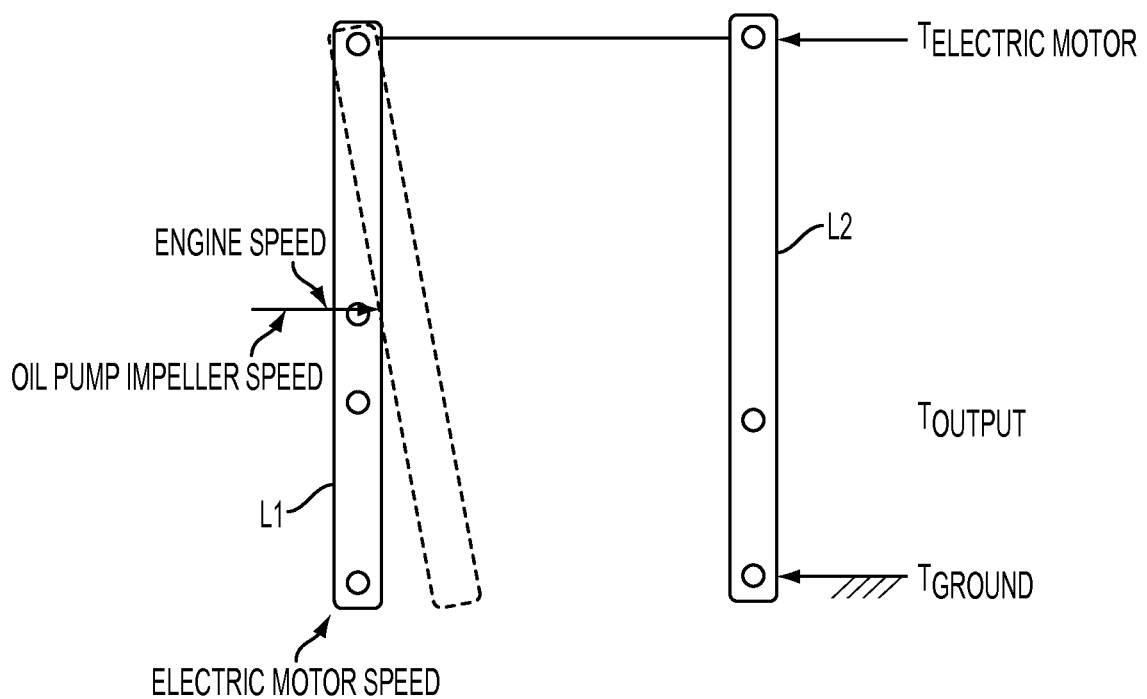
FIG. 4 is a lever diagram of the hybrid powertrain during the ramp down and hydraulic hand-off periods.

FIG. 4 is a lever diagram of the hybrid powertrain during the Ramp Down and Hydraulic Hand-Off periods. As depicted by lever $L_1$, during the Ramp Down and Hydraulic Hand-Off periods ($t_3$-$t_5$ in FIG. 2), the oil pump electric motor 10 is now powering the oil pump impeller 21 to rotate at the desired RPM without the assistance of the electric motor 30. Neither the engine 1 nor electric motor 30 rotate. The over-running clutch 5, now disengaged from the rotation of the transmission input shaft 2, permits the oil pump electric motor rotor 11 and oil pump impeller 21 to rotate freely of the transmission input shaft 1. As depicted by lever L2, torque applied by the electric motor 30 to the oil pump impeller 21 ($T_{Electric\ Motor}$) is balanced out by the torque applied by the transmission housing ($T_{Ground}$).

Thus, the electric motor 30 may be used to assist the oil pump electric motor 10 to initially generate oil pressure for the hybrid powertrain. Once a predetermined oil pressure is achieved, the electric motor 30 is disconnected from the oil pump electric motor 10 and the unassisted oil pump electric motor 10 maintains the predetermined oil pressure for the hybrid powertrain. The electric motor 30 can now be used for propulsion or any other function required by the hybrid powertrain.

The disclosed electric motor assist for the oil pump electric motor may be used with any hybrid powertrain including, but not limited to, a single electric motor hybrid powertrain or two electric motor hybrid powertrain. In a two electric motor hybrid powertrain, either electric motor or both electric motors in combination may provide the assist for the oil pump electric motor.

What is claimed is:

1. A hybrid powertrain system comprising:
   an electric motor,
   an over-running clutch coupled to said electric motor,
   an oil pump electric motor coupled to said over-running clutch, and
   an oil pump coupled to said oil pump electric motor,
   wherein said electric motor is configured to rotate said oil pump for a first period of time,
   wherein after said first period of time, said oil pump electric motor is configured to rotate said oil pump for a second period of time, such that both said electric motor and said oil pump electric motor are rotating said oil pump during said second period of time, and
   wherein after said second period of time, said electric motor is configured to be deactivated such that only said oil pump electric motor is rotating said oil pump.

2. The hybrid powertrain system of claim 1, wherein said overrunning clutch is coupled to said electric motor such that said over-running clutch can freely rotate with respect to said electric motor in a first direction of rotation, but fixedly rotates with said electric motor in a second, opposite direction of rotation.

3. The hybrid powertrain system of claim 1, wherein said hybrid powertrain system further comprises:
   said electric motor coupled to a planetary gear set by a transmission shaft;
   said planetary gear set coupled to a transmission input shaft; and
   said transmission input shaft coupled to said over-running clutch.

4. The hybrid powertrain system of claim 3, wherein said over-running clutch is coupled to said electric motor such that said over-running clutch can freely rotate with respect to said electric motor in a first direction of rotation, but fixedly rotates with said electric motor in a second, opposite direction of rotation.

5. The hybrid powertrain system of claim 4, further comprising an engine coupled to said transmission input shaft, wherein said engine is not activated.

6. The hybrid powertrain system of claim 5, wherein said transmission input shaft is selectively coupled to said engine.

7. The hybrid powertrain system of claim 1, wherein said oil pump achieves an oil pressure of at least approximately 600 kPa in less than approximately 1.25 seconds.

8. A hybrid powertrain system comprising:
   an engine,
   a transmission input shaft coupled to said engine,
   an electric motor coupled to said transmission input shaft by a planetary gear set,
   an over-running clutch coupled to said transmission input shaft, wherein said over-running clutch is coupled to said transmission input shaft such that said over-running clutch can rotate with respect to said transmission input shaft in a first direction but is prevented from rotating with respect to said transmission input shaft in a second, opposite direction,
   an oil pump electric motor having an oil pump electric motor rotor coupled to said over-running clutch, and
   an oil pump having an oil pump impeller coupled to said overrunning clutch,
   wherein said electric motor is configured to rotate said oil pump impeller for a first period of time,
   wherein after said first period of time, said oil pump electric motor is configured to rotate said oil pump impeller for a second period of time, such that both said electric motor and said oil pump electric motor are rotating said oil pump impeller during said second period of time,
   wherein after said second period of time, said electric motor is configured to be decoupled from said oil pump electric motor rotor and said oil pump impeller using said over-running clutch, and
   wherein said oil pump achieves a first oil pressure during the second period of time.

9. The hybrid powertrain system of claim 8, wherein after said electric motor is decoupled from said oil pump electric motor rotor and said oil pump impeller, said oil pump electric motor continues to rotate said oil pump impeller.

10. The hybrid powertrain system of claim 9, wherein said transmission input shaft is a crankshaft of said engine.

11. The hybrid powertrain system of claim 10, wherein said engine is not activated.

12. The hybrid powertrain system of claim 9, wherein said electric motor rotates gears in said planetary gear set after said electric motor is decoupled from said oil pump electric motor rotor and said oil pump impeller.

13. The hybrid powertrain system of claim 12, wherein said first oil pressure is at least approximately 600 kPa and said first period of time and said second period of time are collectively less than approximately 2 seconds.

14. The hybrid powertrain system of claim 8, wherein said first oil pressure is at least approximately 600 kPa and said first period of time and said second period of time are collectively less than approximately 1.25 seconds.

15. The hybrid powertrain system of claim 8, wherein said transmission input shaft is selectively coupled to said engine.

16. The hybrid powertrain system of claim 15, wherein said first oil pressure is at least approximately 800 kPa and said first period of time and said second period of time are collectively less than approximately 1.5 seconds.

* * * * *